United States Patent
Buchanan et al.

(10) Patent No.: US 10,299,642 B2
(45) Date of Patent: May 28, 2019

(54) BLOWER WITH INTAKE CLOSURE

(71) Applicant: MTD PRODUCTS INC, Valley City, OH (US)

(72) Inventors: Peter J. Buchanan, Elyria, OH (US); Erik Krueger, Medina, OH (US)

(73) Assignee: MTD PRODUCTS INC, Valley City, OH (US)

( * ) Notice: Subject to any disclaimer, the term of this patent is extended or adjusted under 35 U.S.C. 154(b) by 337 days.

(21) Appl. No.: 15/174,840

(22) Filed: Jun. 6, 2016

(65) Prior Publication Data
US 2016/0353951 A1    Dec. 8, 2016

Related U.S. Application Data

(60) Provisional application No. 62/171,628, filed on Jun. 5, 2015.

(51) Int. Cl.
*A47L 5/14* (2006.01)
*E01H 1/08* (2006.01)
(Continued)

(52) U.S. Cl.
CPC ............... *A47L 5/14* (2013.01); *A01G 20/47* (2018.02); *E01H 1/0809* (2013.01); *F04D 25/08* (2013.01);
(Continued)

(58) Field of Classification Search
CPC ...... F04D 29/464; F04D 27/003; F04D 25/08; F04D 29/4213; F04D 29/422;
(Continued)

(56) References Cited

U.S. PATENT DOCUMENTS

D621,864 S    3/1899  Smith
2,037,663 A   4/1936  Lalor
(Continued)

FOREIGN PATENT DOCUMENTS

CN    101718349      6/2010
DE    10 2009 033668  1/2011
(Continued)

OTHER PUBLICATIONS

International Search Report and Written Opinion for International Application No. PCT/US2016/036074 dated Sep. 19, 2016.
(Continued)

*Primary Examiner* — Richard A Edgar
(74) *Attorney, Agent, or Firm* — Wegman, Hessler

(57) ABSTRACT

A blower includes a frame, a surface engaging wheel attached to the frame and a power source attached to the frame. An impeller housing is also attached to the frame, and the impeller housing defines an intake opening. The impeller housing surrounds an impeller that is rotatably connected to the power source. An exhaust chute is attached to the impeller housing. A selectively closeable aperture structure is attached to the intake opening. In further examples, the selectively closeable aperture is a pair of rotatable plates both including radial slots or an iris blade assembly. In other examples, the exhaust chute is rotatable or the impeller housing is rotatable.

20 Claims, 10 Drawing Sheets

(51) Int. Cl.
*A01G 20/47* (2018.01)
*F04D 25/08* (2006.01)
*F04D 27/00* (2006.01)
*F04D 29/42* (2006.01)
*F04D 29/70* (2006.01)

(52) U.S. Cl.
CPC ......... *F04D 27/003* (2013.01); *F04D 29/422* (2013.01); *F04D 29/4213* (2013.01); *F04D 29/4226* (2013.01); *F04D 29/703* (2013.01)

(58) Field of Classification Search
CPC ... F04D 29/4226; F04D 29/703; A01G 20/43; A01G 20/47; A47L 5/14; E01H 1/0809
See application file for complete search history.

(56) References Cited

U.S. PATENT DOCUMENTS

| | | | |
|---|---|---|---|
| 2,140,148 A * | 12/1938 | Whitmore | F04D 15/0022 415/116 |
| 2,273,458 A * | 2/1942 | Anderson | F04D 29/464 415/159 |
| 2,321,336 A | 6/1943 | Tondreau | |
| 2,649,272 A | 8/1953 | Barbato | |
| 3,025,882 A * | 3/1962 | Weakly | F04D 29/4213 138/46 |
| 3,284,831 A | 11/1966 | Larsen | |
| 3,310,672 A | 3/1967 | Bursell | |
| 3,396,904 A | 8/1968 | Janette | |
| 3,517,601 A | 6/1970 | Courchesne | |
| 4,094,492 A | 6/1978 | Beeman | |
| 4,118,826 A * | 10/1978 | Kaeser | A01G 20/43 15/328 |
| 4,122,668 A * | 10/1978 | Chou | F01D 21/006 188/290 |
| 4,215,665 A | 8/1980 | Stambaugh | |
| 4,328,831 A | 5/1982 | Wolff | |
| 4,482,291 A | 11/1984 | Chakrawarti et al. | |
| 4,532,961 A | 8/1985 | Walton et al. | |
| 4,679,338 A * | 7/1987 | Middleton | A01D 42/08 37/244 |
| 4,890,595 A | 1/1990 | Fischer | |
| 5,251,281 A | 10/1993 | Fravel, Jr. | |
| 5,503,649 A | 4/1996 | Nickel | |
| 5,535,479 A | 7/1996 | Pink et al. | |
| 5,662,309 A | 9/1997 | Guzorek | |
| 5,735,018 A | 4/1998 | Gallagher | |
| 5,975,493 A | 11/1999 | Ellingson | |
| 6,010,113 A | 1/2000 | Rotering | |
| RE36,627 E | 3/2000 | Pink et al. | |
| 6,059,541 A | 5/2000 | Beckey et al. | |
| 6,085,786 A | 7/2000 | Forsythe | |
| 6,253,416 B1 | 7/2001 | Lauer et al. | |
| 6,375,155 B1 | 4/2002 | Janssens | |
| 6,557,512 B2 | 5/2003 | Leipelt et al. | |
| 6,681,443 B1 | 1/2004 | Bourgeois | |
| 6,712,335 B1 | 3/2004 | Naughton | |
| 6,896,240 B2 | 5/2005 | Wijaya | |
| 6,971,631 B1 | 12/2005 | Naughton | |
| 7,077,632 B2 | 7/2006 | Osburg et al. | |
| 7,093,415 B2 | 8/2006 | Kallevig et al. | |
| 7,261,276 B1 | 8/2007 | Taylor | |
| 7,401,590 B2 | 7/2008 | Schmidt et al. | |
| 7,648,120 B1 | 1/2010 | Kota | |
| 7,658,170 B2 | 2/2010 | Wada et al. | |
| 7,735,188 B2 | 6/2010 | Shaffer | |
| 7,739,800 B2 | 6/2010 | Hurley et al. | |
| 7,819,728 B2 | 10/2010 | Beckley | |
| 7,836,877 B2 | 11/2010 | Gagas et al. | |
| 8,132,783 B2 | 3/2012 | Luebbers | |
| 8,196,610 B2 | 6/2012 | Murakami | |
| 8,215,613 B2 | 7/2012 | Cheung | |
| 8,231,335 B2 | 7/2012 | Barker | |
| D702,902 S | 4/2014 | Lauer | |
| D706,005 S | 5/2014 | Lauer | |
| 8,742,703 B2 | 6/2014 | Binder et al. | |
| 8,801,402 B2 | 8/2014 | Chu et al. | |
| 8,910,920 B1 | 12/2014 | Daniels | |
| 2006/0005347 A1 | 1/2006 | Griffin et al. | |
| 2007/0022720 A1 | 2/2007 | Guertin | |
| 2007/0220702 A1 | 9/2007 | Lauer et al. | |
| 2009/0104051 A1 * | 4/2009 | Wang | F04D 29/70 417/321 |
| 2010/0130121 A1 | 3/2010 | Chiu | |
| 2011/0146250 A1 | 6/2011 | Vanvolsem | |
| 2011/0260087 A1 | 10/2011 | Perr et al. | |
| 2012/0246865 A1 | 10/2012 | Lauer | |
| 2012/0285543 A1 | 11/2012 | Michaels | |

FOREIGN PATENT DOCUMENTS

| | | |
|---|---|---|
| EP | 0 460 537 | 12/1991 |
| GB | 267245 | 3/1927 |
| JP | 2002195540 | 7/2002 |
| JP | 2004003517 | 1/2004 |
| JP | 2014084818 | 5/2014 |
| WO | 9966237 | 12/1999 |
| WO | 2005057065 | 6/2005 |

OTHER PUBLICATIONS

U.S. Appl. No. 13/435,749.

* cited by examiner

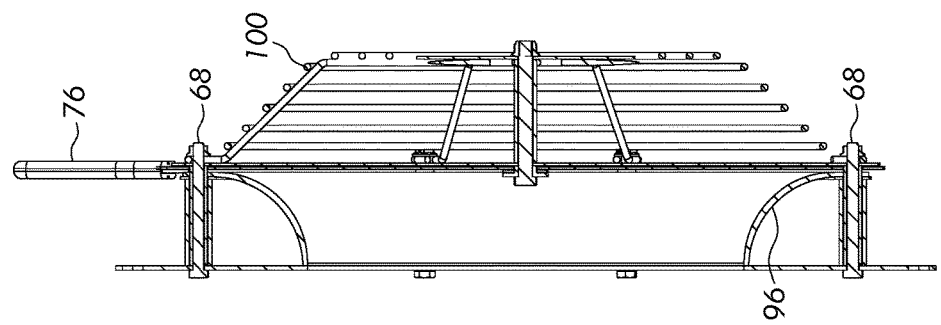
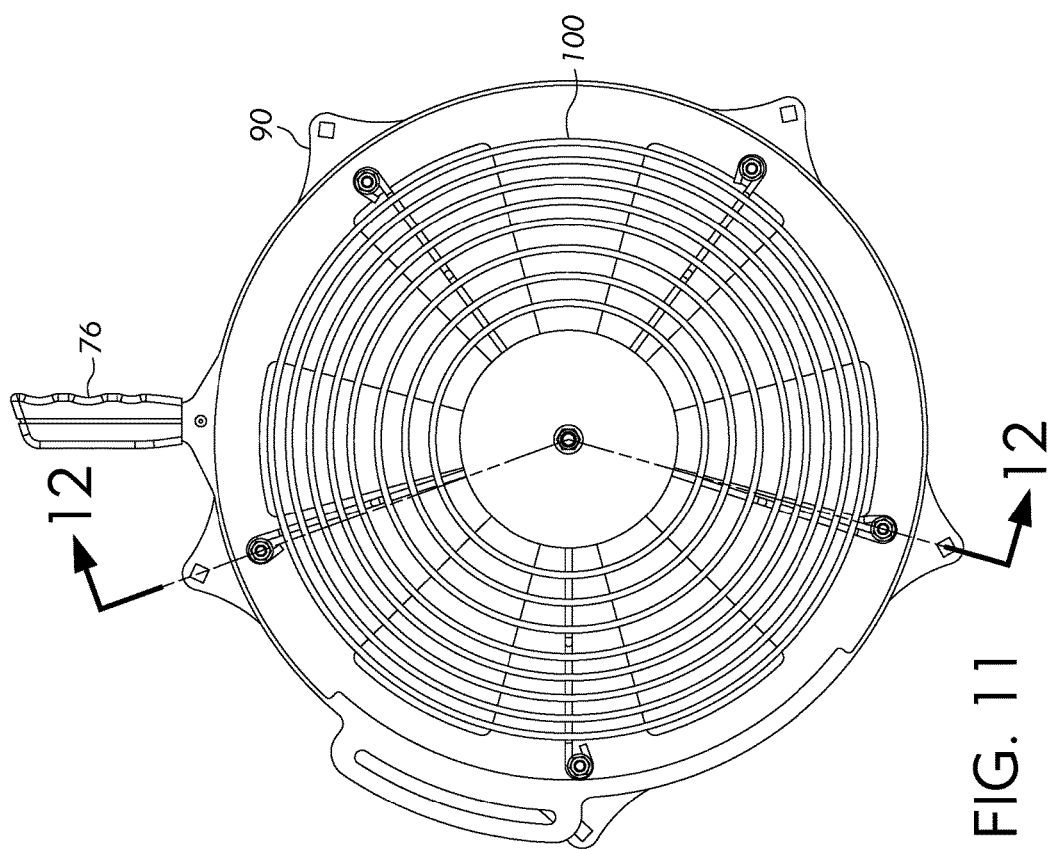

BLOWER WITH INTAKE CLOSURE

CROSS-REFERENCE TO RELATED APPLICATION

This application claims the benefit of U.S. Provisional Application No. 62/171,628, filed Jun. 5, 2015, the entire disclosure of which is hereby incorporated herein by reference.

BACKGROUND

1. Field of the Disclosure

The present disclosure is directed to blowers, and more particularly, a blower including an intake closure.

2. Description of Related Art

Some known blowers include shut-offs at their outlets, increasing the difficulty of throttling the flow of blown air. It is sometimes desirable to throttle the blown air, particularly around mulched beds, and the like. Other blowers do not have rotatable outlets. Still other blowers lack the capability to convert into vacuums for the lawn.

Accordingly, there is a need for a blower that provides easier throttling of blown air, greater ease of directing the blown air, and greater ease in using the blower as a vacuum.

SUMMARY

According to one aspect of the present disclosure, a blower includes a frame and a surface engaging wheel attached to the frame. The blower also includes a power source attached to the frame and an impeller housing attached to the frame. The impeller housing defines an intake opening. The blower further includes an impeller rotatably connected to the power source and is positioned within the impeller housing. The blower still further includes an exhaust chute attached to the impeller housing. The blower also includes a selectively closeable aperture structure attached to the intake opening.

According to another aspect of the present disclosure, a blower includes a frame and a surface engaging wheel attached to the frame. The blower also includes a power source attached to the frame and an impeller housing attached to the frame. The impeller housing defines an intake opening. The blower further includes an impeller rotatably connected to the power source and is positioned within the impeller housing. The blower still further includes an exhaust chute attached to the impeller housing. The exhaust chute is selectively rotatable.

According to another aspect of the present disclosure, a blower includes a frame and a surface engaging wheel attached to the frame. The blower also includes a power source attached to the frame. The blower further includes an impeller housing attached to the frame. The impeller housing defines an intake opening. The blower still further includes an impeller including an axis of rotation. The impeller is rotatably connected to the power source and is positioned within the impeller housing. The blower also includes an exhaust chute attached to the impeller housing. The exhaust chute is selectively rotatable. The impeller housing is configured to rotate about said axis of rotation.

Advantages of the present disclosure will become more apparent to those skilled in the art from the following description of the embodiments of the disclosure which have been shown and described by way of illustration. As will be realized, the described apparatus and method are capable of other and different embodiments, and their details are capable of modification in various respects.

BRIEF DESCRIPTION OF THE DRAWINGS

These and other features of the present disclosure, and their advantages, are illustrated specifically in embodiments of the disclosure now to be described, by way of example, with reference to the accompanying diagrammatic drawings, in which:

FIG. 11 is a front view of the assembled components of FIG. 10; and

FIG. 12 is an elevation view of the assembled components of FIG. 10.

Figure 1:
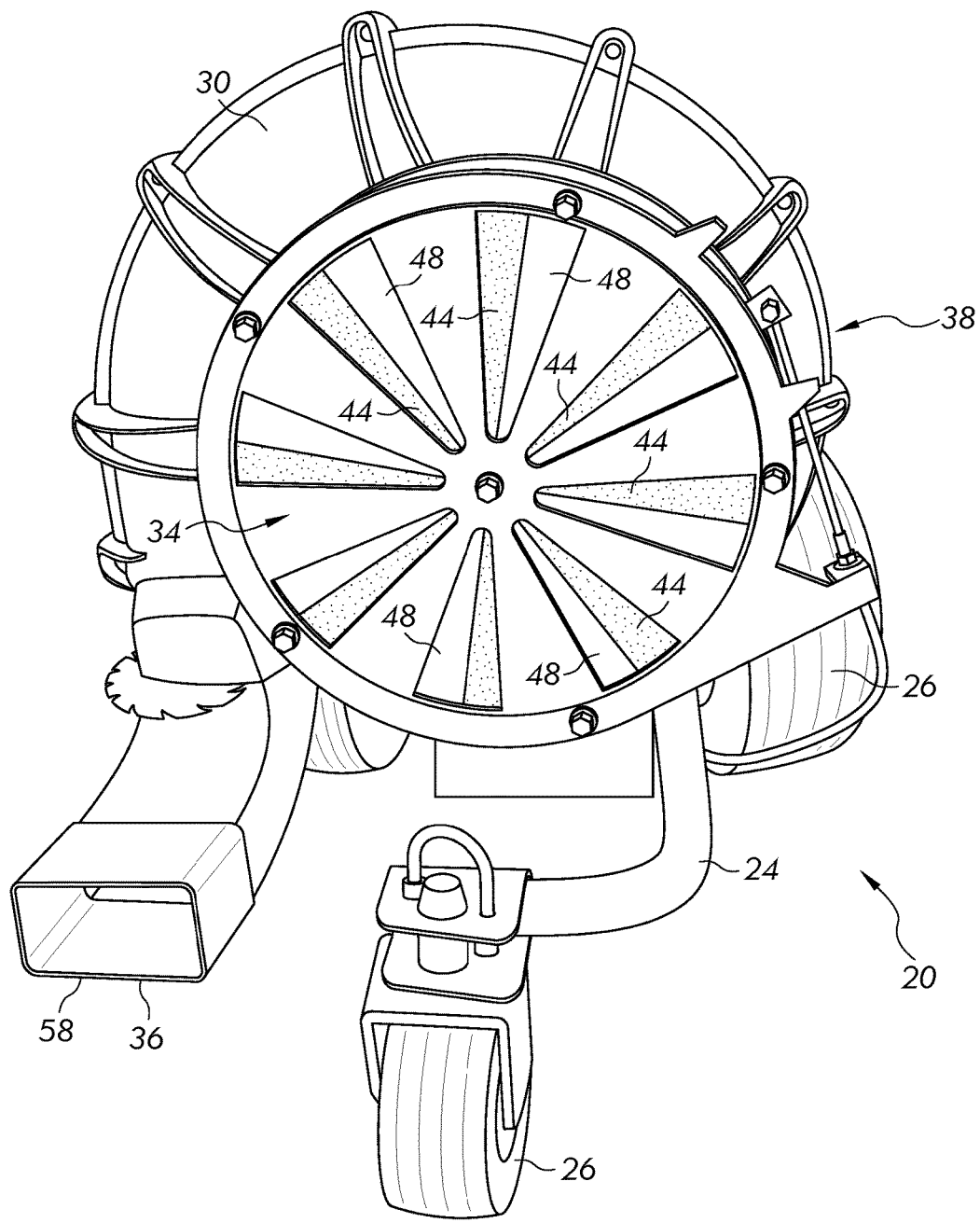
FIG. 1 is a front view of an embodiment of a blower apparatus of the present disclosure having an intake door shut-off with radial slots.

It should be noted that all the drawings are diagrammatic and not drawn to scale. Relative dimensions and proportions of parts of these figures may have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Turning to FIG. 1, an embodiment of a blower 20 is shown with a front view. It is to be understood that several components of the blower 20 are not shown in the interest of simplicity. The blower 20 includes a frame 24 that is constructed to provide a framework for many of the components of the blower 20. In one example, the frame 24 is formed of tubular metal, but it should be understood by one having ordinary skill in the art that any other material having sufficient structural rigidity and able to withstand the wear-and-tear due to the operation thereof is acceptable.

Figure 2:
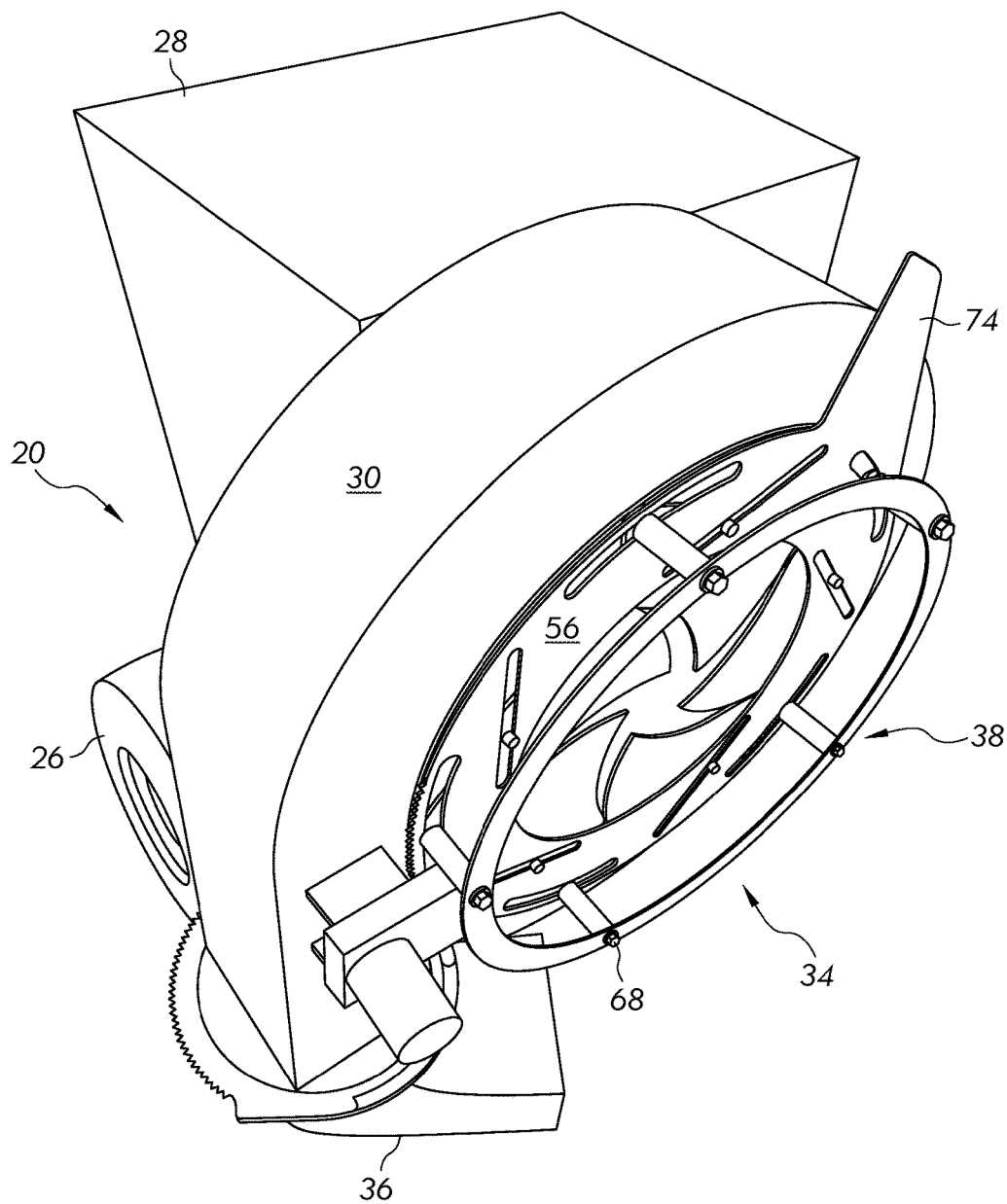
FIG. 2 is a perspective view of an example blower similar to FIG. 1, but having an iris blade assembly on the intake door shut-off.

The blower 20 also includes a surface engaging wheel 26 attached to the frame 24. The example shown in the figures includes three surface engaging wheels 26, however, any number of wheels 26 is acceptable. The blower 20 further includes a power source 28 attached to the frame 24 and configured to power an impeller (not shown). The power source 28 is best seen in FIG. 2 and is represented schematically as a box. In one example, the power source 28 is an internal combustion engine. In another example, the power source 28 is an electric motor. It should be understood by one having ordinary skill that the power source 28 can be any prime mover that is powered by fuel, electricity, or a hybrid-electric device. The power source 28 is configured to generate a rotational output either directly or indirectly to an output shaft (not shown) that can extend substantially horizontally toward the impeller.

The blower 20 also includes an impeller housing 30 attached to the frame 24. The impeller housing 30 defines an intake opening 34. The impeller housing 30 is configured to confine and define an airflow developed by the impeller and direct that airflow from the intake opening 34 to an exhaust chute 36 that is attached to the impeller housing 30. The impeller is positioned within the impeller housing 30 and is rotatably connected to the power source 28. As the power source generates rotational power, the power source urges the output shaft to rotate and, in turn, urges the impeller to rotate.

The blower 20 also includes a selectively closeable aperture structure 38 attached to the intake opening 34. The selectively closeable aperture structure 38 can take any suitable form. In one example, the selectively closeable aperture structure 38 is a multi-piece door in the form of a ladybug closure, or two generally semi-circular plates that can rotate apart to provide an open space at the intake opening 34.

Figure 7:
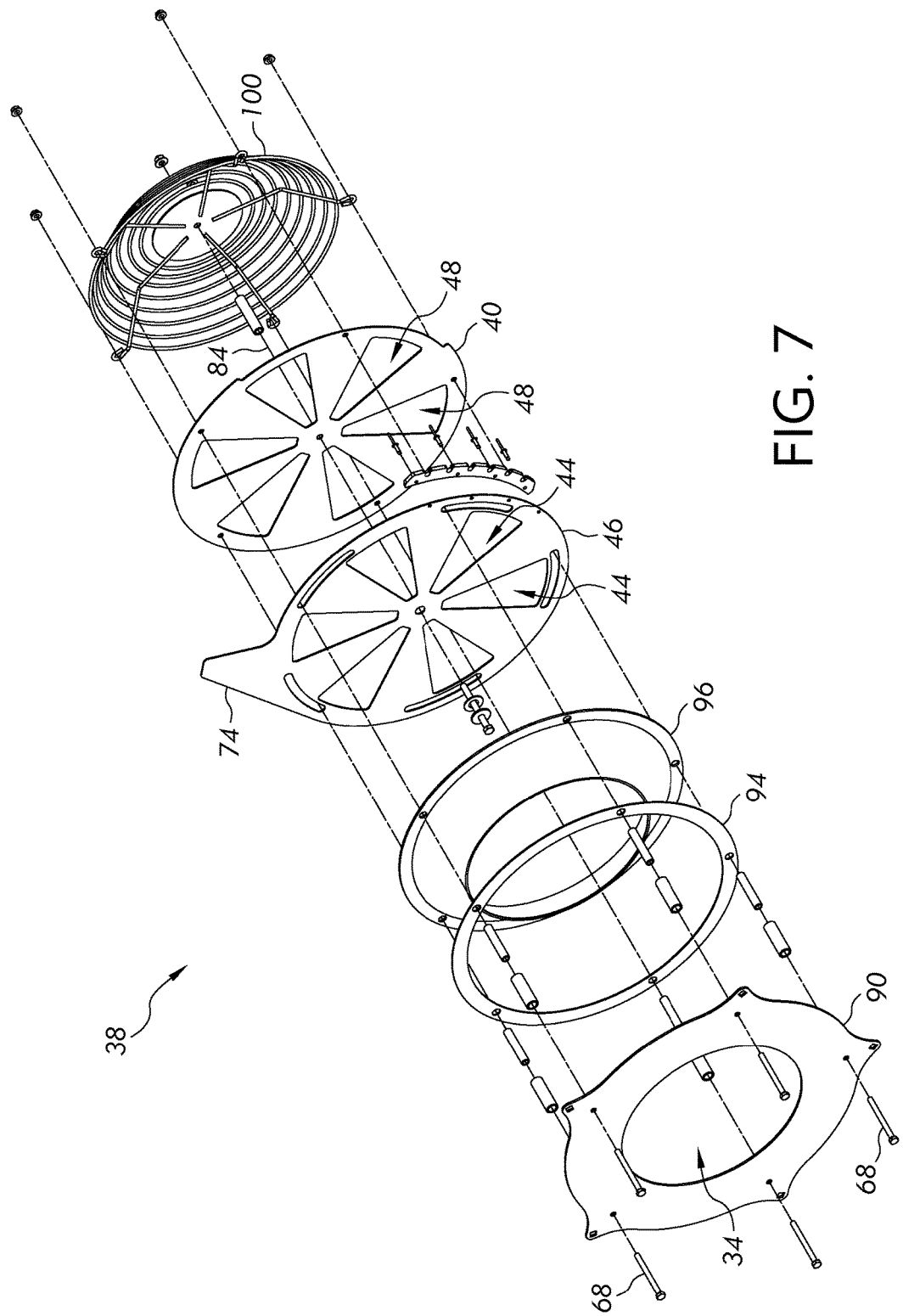
FIG. 7 is an exploded view of several components located at the intake of the blower of FIG. 1 for an automated intake closure.
Figure 8:
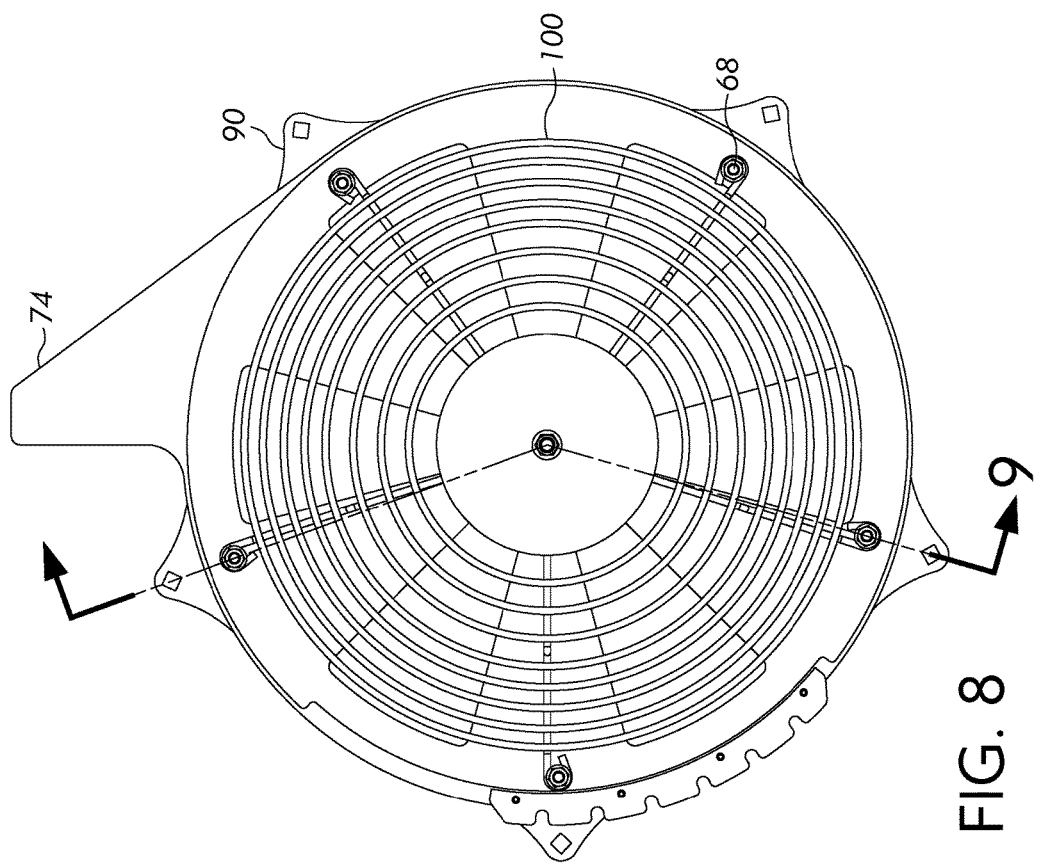
FIG. 8 is a front view of the assembled components of FIG. 7.

In another example, the selectively closeable aperture structure 38 is a rotationally variable disc defining radial slots 44 as shown in FIGS. 1, 7, and 8. In this example, the selectively closeable aperture structure 38 includes a five (5) bolt mounting arrangement holding a disc-like structure 40 a distance from the intake opening 34. The disc-like structure 40 defines radial slots 48. The radial slots 48 can be non-uniform in width along their length. The closeable aperture structure 38 further includes a rotationally variable disc 46 that is controlled by the operator (typically with a lever at the handle). The rotationally variable disc 46 also defines slots 44 which can be selectively placed in alignment or out of alignment with the disc-like structure 40 radial slots 48. This arrangement enables the operator to quickly open and close the intake opening 34 through a continuum of positions from a designed percentage of air flow area 100% open to zero (0)% air flow area open.

In other words, each of the plates 40, 46 defines a number of radial slots 44, 48 that are the same shape and size or relatively similar in size and shape. One plate 40 remains stationary while the other plate 46 can be selectively rotated to align the radial slots 48 of one plate 40 with the radial slots 44 of the other plate 46. When the radial slots 44, 48 are in alignment, a suitable area for fluid communication is maintained between an exterior space and the impeller. During a blowing operation, an operator can selectively rotate the movable plate 46 to remove the alignment between the radial slots 48 of one plate 40 and the radial slots 44 of the other plate 46. The decreasing alignment of the slots 44, 48 can throttle the total area of the opening for fluid communication between the exterior space and the impeller along a continuum between fully open and fully closed. Closing the radial slots 44, 48 greatly decreases the amount of air that can flow from the exterior space to the impeller, thus effectively shutting off the flow of intake air from the blower 20, thereby shutting off the flow of air exiting the exhaust chute 36.

Figure 5:
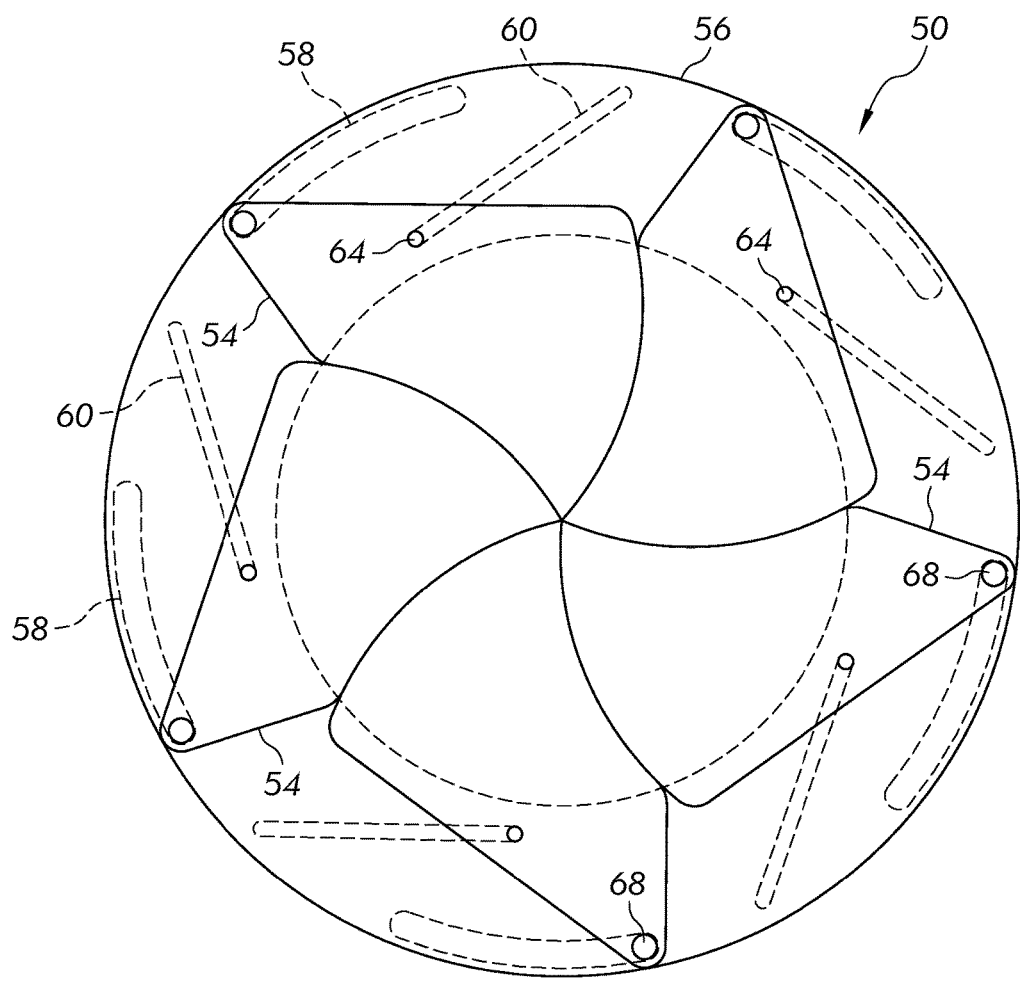
FIG. 5 is a representation of the iris blade assembly 100% closed to show the geometry of the assembly.
Figure 6:
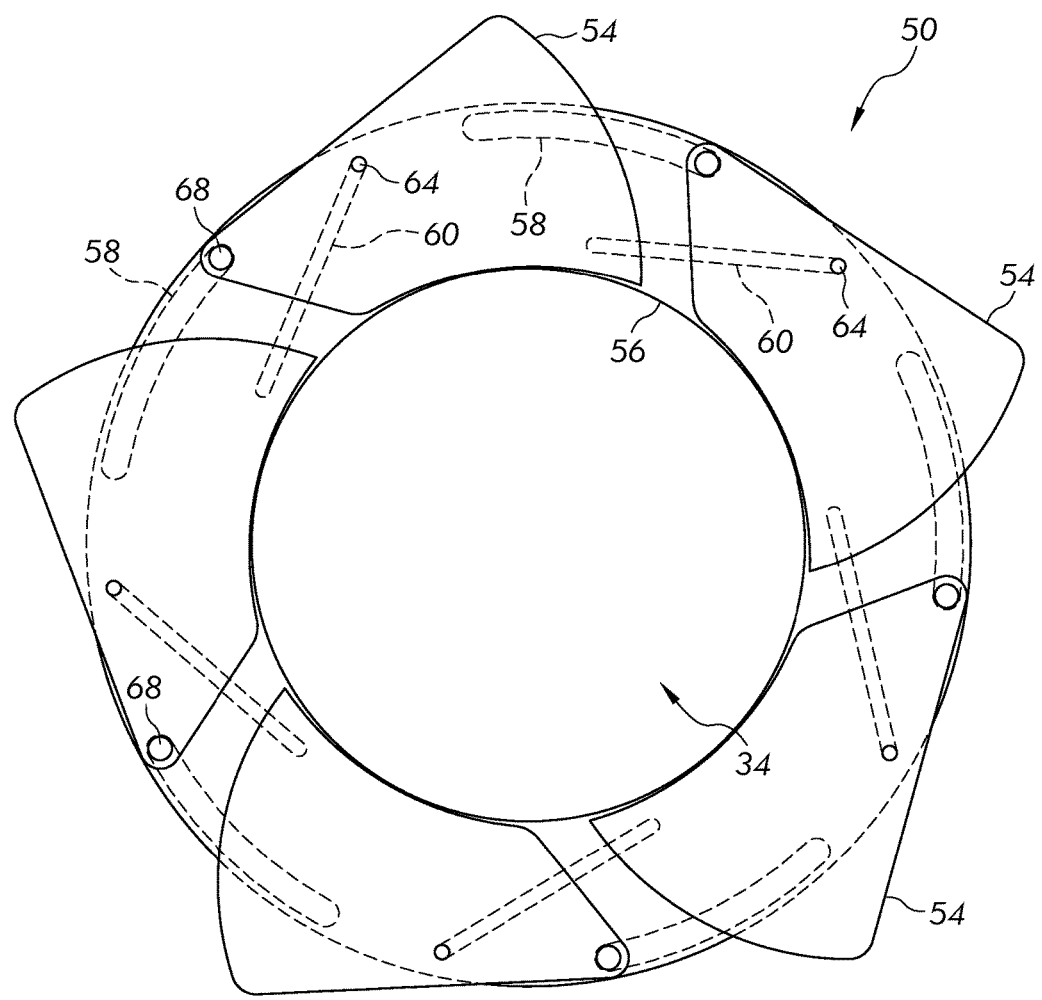
FIG. 6 is similar to FIG. 5, showing the iris blade assembly 100% open.

In another example, the selectively closeable aperture structure 38 is a rotationally activated iris opening assembly 50. FIG. 5 shows the iris opening assembly 50 in the 0% open position. FIG. 6 shows the iris opening assembly 50 in the 100% open position. Similar to the disc-like structure 40, the iris opening assembly 50 can open and close the intake opening 34 through a continuum of positions from 100% of open air flow area to zero (0)% open. In one example, the rotationally activated iris opening assembly 50 includes translating iris blades. In another example, the rotationally activated iris opening assembly 50 includes rotating iris blades 54.

In the rotating iris blades 54 example, the iris opening assembly 50 can include a five (5) bolt mounting structure wherein each bolt also provides a mounting point and rotation point for each of the iris blades. It is to be understood that different numbers of mounts and iris blades can be used, and the quantity of each can often be equal. A rotational ring 56 can include a set of five (5) arcuate slots 58 and a set of five (5) linear slots 60. The rotational ring 56 can be operated electrically or manually and rotates through a limited angle to effect full (100%) open to full close (0% open) positions for the iris blades 54. The iris blades 54 include posts 64 or fingers that extend through the linear slots 60. As the rotational ring 56 rotates, the movement of the linear slots 60 moves the post 64 of each iris blade 54 to rotate the iris blade 54 about its respective rotation point (one of the bolts 68 of the five (5) bolt mounting arrangement). As the rotational ring 56 is rotated, the motion of each linear slot 60 forces the respective post 64 (and thus, the iris blade 54) to rotate about the rotatable mounting point 68. This rotation urges the iris blade 54 to rotate to a position along the described continuum to open or close the aperture.

Figure 4:
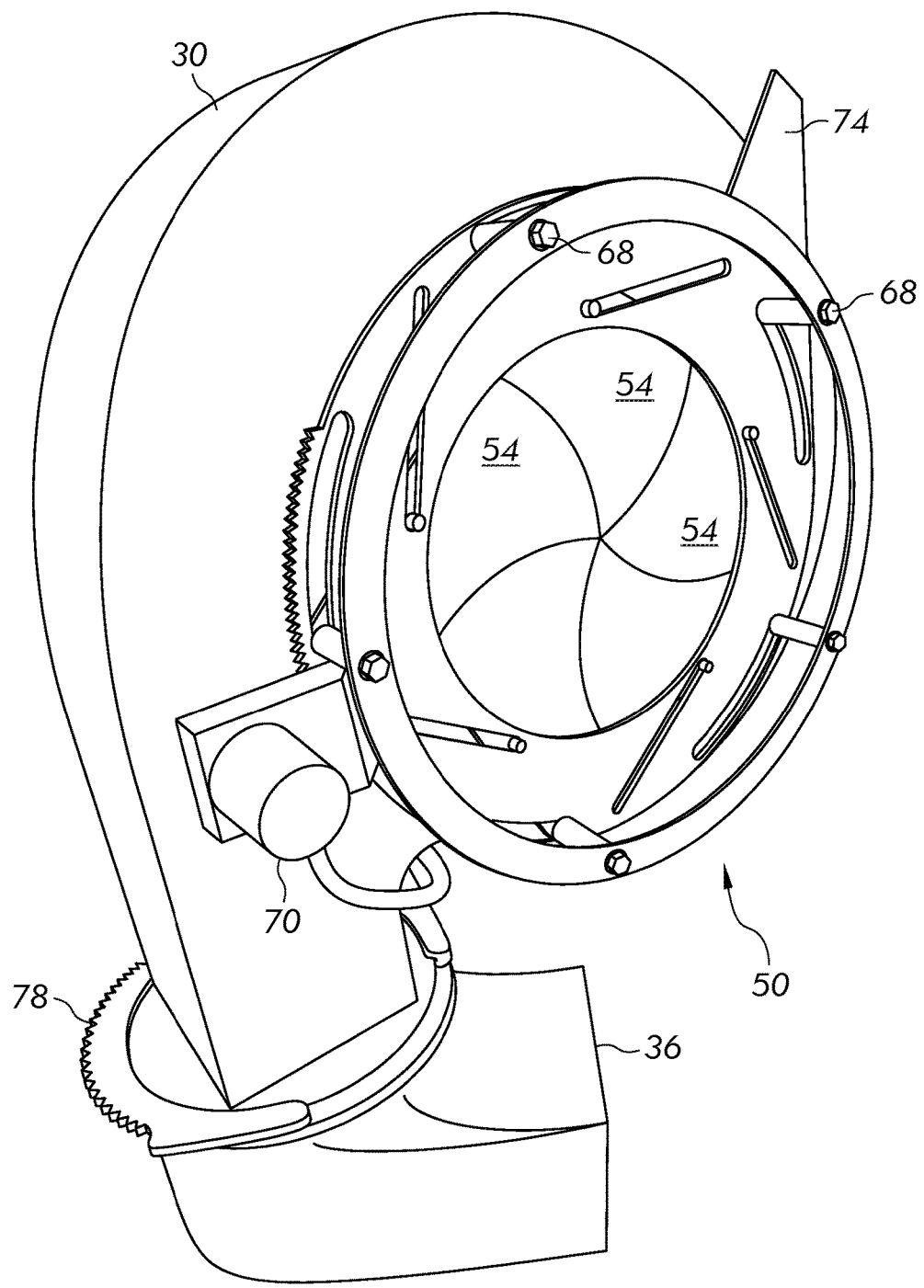
FIG. 4 is similar to FIG. 3 showing the iris blade assembly 100% shut.

An actuator 70 (best seen in FIG. 4) can be placed next to the rotational ring 56, such as a gear motor, to rotate the rotational ring 56. A flag 74 can be placed on the rotational ring 56 to give a visual indication to the operator of the open percentage of the iris opening assembly 50. For the manually operated iris opening assembly 50, a handle 76 can be attached to the movable plate 46 to help the operator gain leverage and also have a visual indication of the open percentage of the intake opening 34.

Figure 3:
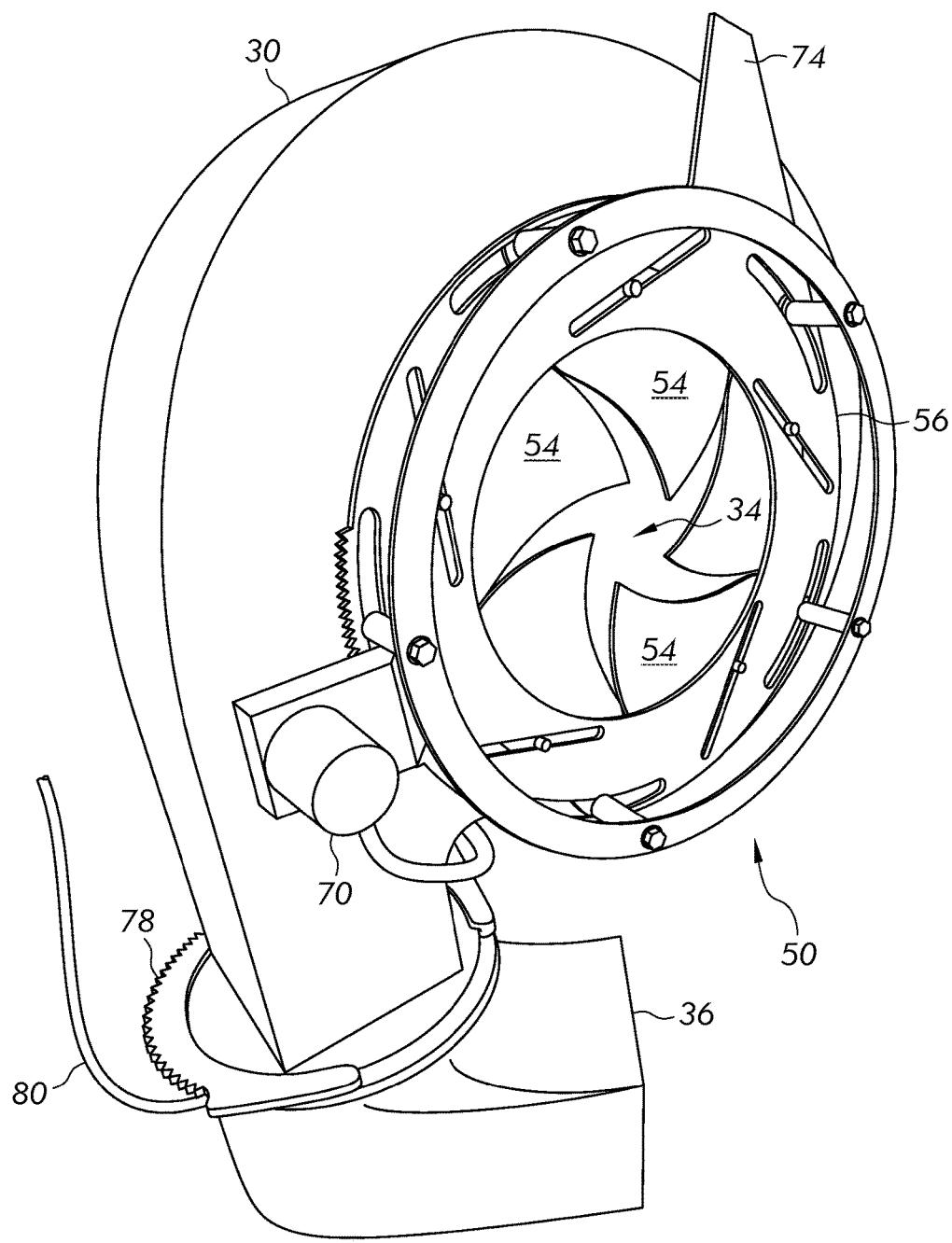
FIG. 3 is a detail view of the iris blade assembly of FIG. 2.

Referring to FIG. 3, the blower 20 can also include a selectively rotatable exhaust chute 36 attached to the impeller housing 30. In one example, the exhaust chute 36 rotates at least about 180°. In another example, the exhaust chute 36 is operated by an electrically-operated joystick control that is configured to rotate the exhaust chute 36 at least about 180°. In this example, a set of teeth 78 similar to gear teeth can be located on a portion of the exhaust chute 36 to enable an actuator to gain leverage to rotate the exhaust chute 36. In a further example, a push-pull cable 80 can be used with a manual lever (not shown) to manually rotate the exhaust chute 36.

In another example of the blower, the impeller housing 30 is configured to rotate about an axis of rotation 84 of the impeller. The rotation can be about 180°, and move the exhaust chute 36 from ground level on the right side (from the perspective of the operator) to a location above the ground on the left side of the operator. In this position, the operator can place a bag on the exhaust chute 36 and bag yard waste that moves through the blower 20, in effect making the blower 20 a vacuum. The iris opening assembly 50 aids in passing leaves, twigs, and other lawn debris easily from the exterior of the blower 20, through the airflow, and into a bag, or other desired location for the lawn debris.

Figure 9:
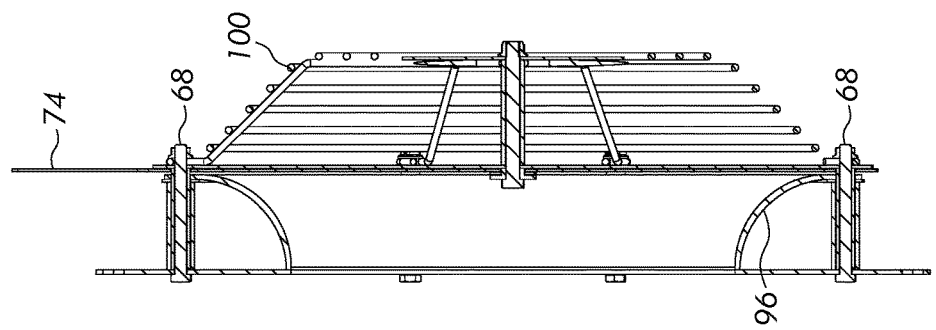
FIG. 9 is an elevation view of the assembled components of FIG. 7.
Figure 10:
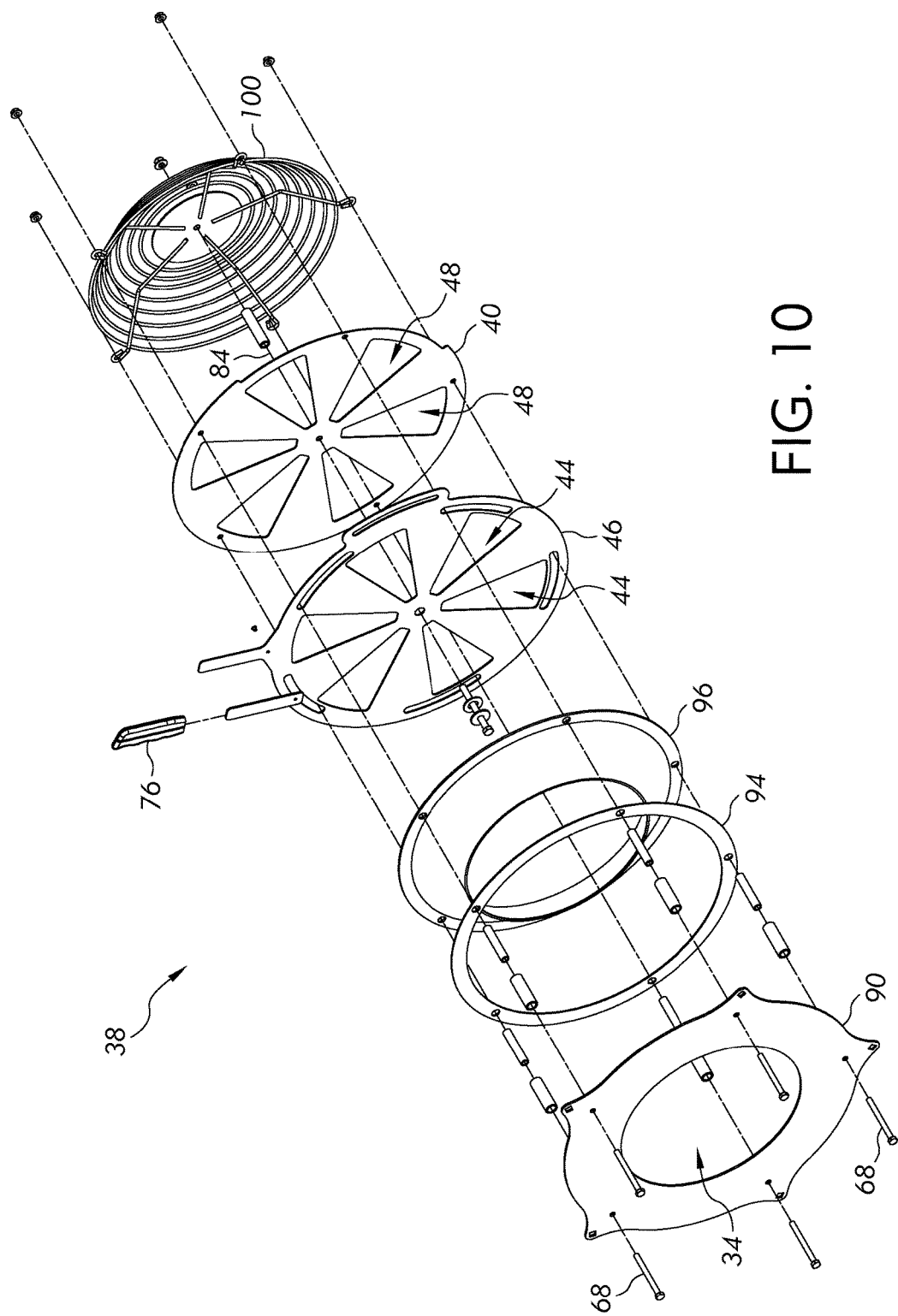
FIG. 10 is similar to FIG. 7 showing a manual intake closure.

FIGS. 7-12 represent further information regarding the selectively closeable aperture structure 38 is a rotationally variable disc defining radial slots 44 as previously described. FIGS. 7 and 10 show an exploded view of the closeable aperture structure 38 mounted about axis 84. FIG. 7 includes the automated version and FIG. 10 the manual version. The bolts 68 are one example of a mounting structure used to fasten this assembly to the impeller housing 30. The bolts and appropriate spacers connect a portion 90 of the impeller housing 30 to a ring 94, and a funnel-like structure 96. The funnel-like structure 96 can help reduce turbulent air flow and promote more laminar air flow as it enters the blower 20. The previously described two disc structures 46, 40 are then mounted to the assembly, followed by a guard 100.

FIG. 8 represents a front view of the assembly of FIG. 7 while FIG. 9 represents a cross-section side view of the assembly of FIG. 7. Similarly, FIG. 11 represents a front view of the assembly of FIG. 10 while FIG. 12 represents a cross-section side view of the assembly of FIG. 10.

Each of the blower intake opening structures were developed to enable a quicker and more convenient way to throttle and/or stop a stream of blown air from the blower 20. In many known blowers, a shut-off is provided at the outlet nozzle, or exhaust chute. The nozzle shut-offs can be relatively difficult to operate as the air stream can add resistance to the shut-off device. Additionally, the shut-off device located at the nozzle can be less effective, as an impeller has created a relatively high-volume air flow. Each of the above described structures includes a shut-off device on the intake side of the impeller, rather than at the discharge nozzle or any other location.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A blower, said blower comprising:
a frame;
a surface engaging wheel attached to said frame;
a power source attached to said frame;
an impeller housing attached to said frame, said impeller housing defining an intake opening;
an impeller rotatably connected to said power source and positioned within said impeller housing;
an exhaust chute attached to said impeller housing; and
a selectively closeable aperture structure attached to said intake opening; and
an actuator for selectively moving said selectively closeable aperture structure between a fully open position, a fully closed position, or a position between said open and said closed position, wherein said actuator is a gear motor.

2. The blower according to claim 1, wherein said selectively closeable aperture structure is a rotationally variable disc defining radial slots.

3. The blower according to claim 1, wherein said selectively closeable aperture structure is a rotationally activated iris opening assembly.

4. The blower according to claim 3, wherein said rotationally activated iris opening assembly includes translating iris blades.

5. The blower according to claim 3, wherein said rotationally activated iris opening assembly includes rotating iris blades.

6. The blower according to claim 1, wherein the selectively closeable aperture structure is selectively rotatably closeable.

7. The blower according to claim 1, wherein the selectively closeable aperture structure is rotationally activated.

8. The blower according to claim 1, wherein the exhaust chute extends to an exhaust opening, and wherein the exhaust chute and the exhaust opening are selectively rotatable relative to the impeller housing.

9. The blower according to claim 1, wherein the exhaust chute extends to an exhaust opening, and wherein the impeller housing, exhaust chute and the exhaust opening are selectively rotatable about a rotational axis about which the impeller is rotatable.

10. The blower of claim 1, wherein said selectively closeable aperture structure includes a funnel-like structure positioned adjacent to said intake opening of said impeller housing.

11. The blower of claim 1, wherein said exhaust chute is selectively rotatable.

12. The blower of claim 11, wherein said exhaust chute rotates at least about 180°.

13. The blower of claim 11 further including a joystick control, wherein said joystick control is configured to rotate said exhaust chute at least about 180°.

14. The blower of claim 1, wherein said impeller is rotatable about an axis of rotation, and said impeller housing is configured to rotate about said axis of rotation of said impeller.

15. The blower of claim 1, wherein said selectively closeable aperture structure includes a rotational ring and a plurality of iris blades operatively connected to said rotational ring, wherein rotation of said rotational ring causes said plurality of iris blades to rotate between a fully open position, a fully closed position, or a partially open position that is between said fully open position and said fully closed position.

16. The blower of claim 15, wherein each iris blade is rotatable about a bolt that connects said iris blade to said impeller housing.

17. The blower of claim 16, wherein each iris blade further includes a post that is received within a corresponding linear slot formed in said rotational ring, and rotation of said rotational ring causes said post of each of said iris blades to slide along said corresponding slot to cause said iris blade to rotate about said bolt.

18. The blower of claim 15, wherein said rotational ring is selectively rotated manually or selectively rotated by a motor.

19. The blower of claim 1, wherein said selectively closeable aperture structure includes a first plate having a plurality of radial slots and a second plate having a plurality of radial slots, said second plate being rotatable relative to said first plate between a fully open position in which each of said slots of said second plate are aligned with corresponding slots of said first plate and a fully closed position in which each of said slots of said first plate are covered by said second plate.

20. The blower of claim 19, wherein said slots of said first plate and said second plate are non-uniform in width along a radial length of said slot.

\* \* \* \* \*